United States Patent
De Gaetano et al.

(10) Patent No.: US 10,769,829 B2
(45) Date of Patent: Sep. 8, 2020

(54) ADAPTING LAYERS OF AN IMAGE FOR EACH RECIPIENT PERSPECTIVE

(71) Applicant: INTERNATIONAL BUSINESS MACHINES CORPORATION, Armonk, NY (US)

(72) Inventors: Rossella De Gaetano, Rome (IT); Gabriele de Capoa, Rome (IT); Alessandro Ghezzi, Rome (IT); Valerio Mercuri, Rome (IT); Alfonso D'Aniello, Rome (IT); Martha Pinelo, Rome (IT); Corrado Gianfelici, Rome (IT); Andrea Tortosa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/148,151

(22) Filed: Oct. 1, 2018

(65) Prior Publication Data
US 2020/0105035 A1    Apr. 2, 2020

(51) Int. Cl.
G06T 11/60    (2006.01)
G06T 7/10    (2017.01)
G06T 7/70    (2017.01)

(52) U.S. Cl.
CPC .............. G06T 11/60 (2013.01); G06T 7/10 (2017.01); G06T 7/70 (2017.01)

(58) Field of Classification Search
None
See application file for complete search history.

(56) References Cited

U.S. PATENT DOCUMENTS

| 9,762,719 | B2 * | 9/2017 | Tartz | G06F 3/005 |
|---|---|---|---|---|
| 2010/0268682 | A1 | 10/2010 | Lewis et al. | |
| 2014/0002644 | A1 | 1/2014 | Fedorovskaya et al. | |
| 2017/0140563 | A1 | 5/2017 | No et al. | |
| 2018/0007053 | A1 * | 1/2018 | Grant | H04L 63/101 |

FOREIGN PATENT DOCUMENTS

| JP | 2006005945 | 1/2006 |
|---|---|---|
| KR | 20150020010 A | 2/2015 |

OTHER PUBLICATIONS

"Suggestive Content Alteration Towards Positive Sentiment", The IP.com Prior Art Database, IPCOM000247483D, Sep. 9, 2016, 13 pages.

* cited by examiner

Primary Examiner — Michelle Chin
(74) Attorney, Agent, or Firm — Feb R. Cabrasawan; Amy J. Pattillo

(57) ABSTRACT

An image controller intercepts a digital representation of an image originating from a user. The image controller performs a visual recognition operation on the image to identify at least one visual layer of a plurality of layers within the image and a separate perspective of the user associated with each layer. The image controller identifies a replacement layer assigned to an identifiable recipient, for a particular layer of the plurality of layers, in an analytics database specifying an expected perspective that corresponds with the separate perspective of the user for the particular layer. The image controller modifies the particular layer with the replacement layer for obtaining a transformed image amended for the identifiable recipient.

20 Claims, 6 Drawing Sheets

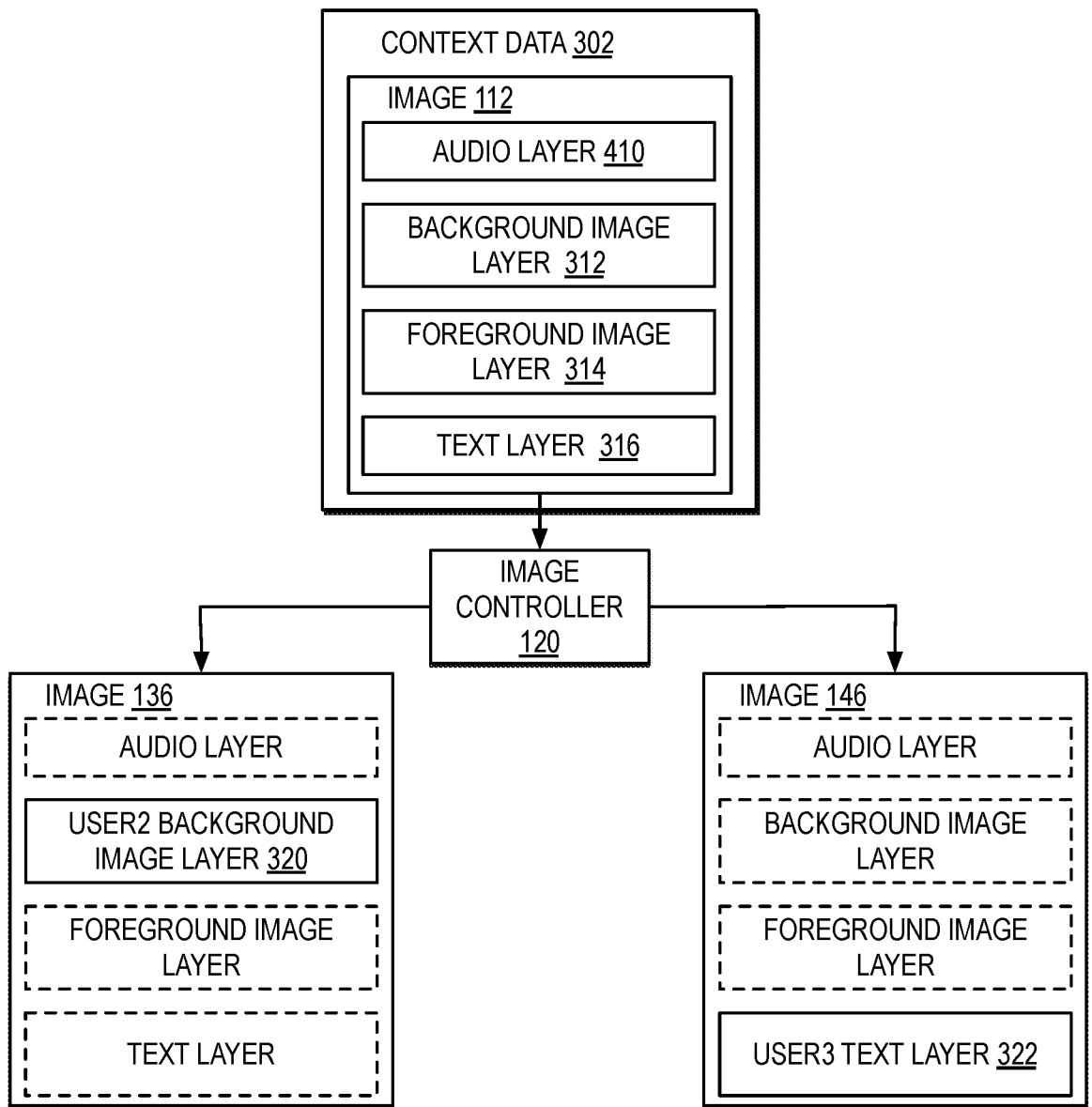

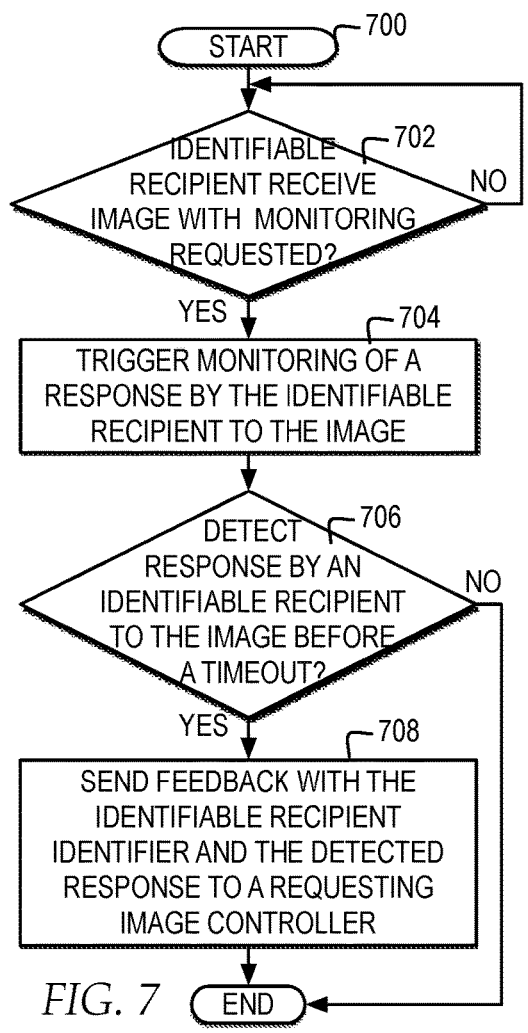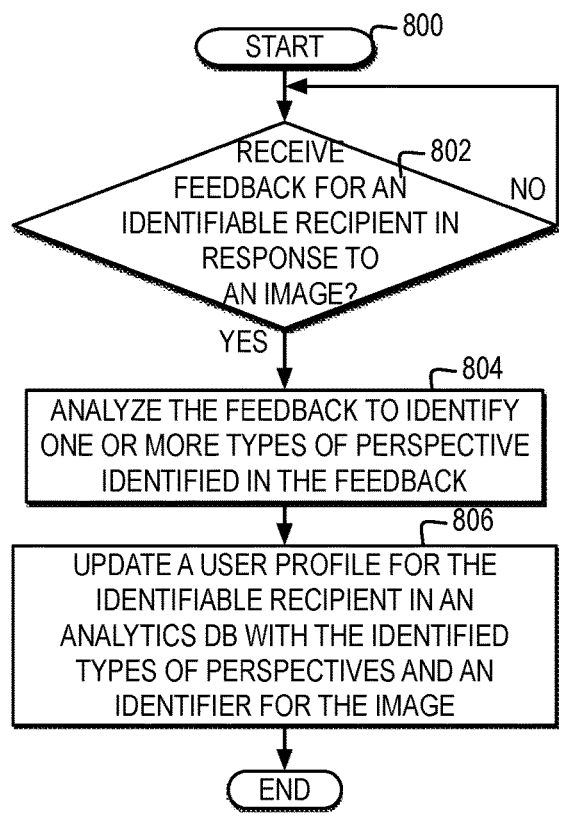
FIG. 7
FIG. 8

ADAPTING LAYERS OF AN IMAGE FOR EACH RECIPIENT PERSPECTIVE

BACKGROUND

1. Technical Field

This invention relates in general to computing systems and more particularly to adapting layers of an image for each recipient perspective.

2. Description of the Related Art

The response, understanding, or feeling that a recipient has when interacting with an image is determined, in part, based on the recipient's perspective. Different recipients, each with a different perspective, have different responses to a same static or moving image with visible, audible, and other output elements.

BRIEF SUMMARY

In one embodiment, a method is directed to receiving, by a computer system, a digital representation of an image originating from a user. The method is directed to performing, by the computer system, a visual recognition operation on the image to identify at least one visual layer of a plurality of layers within the image and a separate perspective of the user associated with each layer. The method is directed to identifying, by the computer system, a replacement layer assigned to an identifiable recipient, for a particular layer of the plurality of layers, in an analytics database specifying an expected perspective that corresponds with the separate perspective of the user for the particular layer. The method is directed to modifying, by the computer system, the particular layer with the replacement layer for obtaining a transformed image amended for the identifiable recipient.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a digital representation of an image originating from a user. The stored program instructions comprise program instructions to perform a visual recognition operation on the image to identify at least one visual layer of a plurality of layers within the image and a separate perspective of the user associated with each layer. The stored program instructions comprise program instructions to identify a replacement layer assigned to an identifiable recipient, for a particular layer of the plurality of layers, in an analytics database specifying an expected perspective that corresponds with the separate perspective of the user for the particular layer. The stored program instructions comprise program instructions to modify the particular layer with the replacement layer for obtaining a transformed image amended for the identifiable recipient.

In another embodiment, a computer program product comprises a computer readable storage medium having program instructions embodied therewith, wherein the computer readable storage medium is not a transitory signal per se. The program instructions are executable by a computer to cause the computer to receive, by a computer, a digital representation of an image originating from a user. The program instructions are executable by a computer to cause the computer to perform, by the computer, a visual recognition operation on the image to identify at least one visual layer of a plurality of layers within the image and a separate perspective of the user associated with each layer. The program instructions are executable by a computer to cause the computer to identify, by the computer, a replacement layer assigned to an identifiable recipient, for a particular layer of the plurality of layers, in an analytics database specifying an expected perspective that corresponds with the separate perspective of the user for the particular layer. The program instructions are executable by a computer to cause the computer to modify, by the computer, the particular layer with the replacement layer for obtaining a transformed image amended for the identifiable recipient.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 3 is a block diagram illustrating one example of arrays identifying layers of an image translated into arrays of layers for an identifiable recipient;

FIG. 4 is a block diagram illustrating one example of an image with layers adapted for each identifiable recipient perspective;

FIG. 7 illustrates a high level logic flowchart of a process and computer program for monitoring for a response to an image from an identifiable user;

FIG. 8 illustrates a high level logic flowchart of a process and computer program for managing updates to a user perspective profile based on user responses to an image.

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
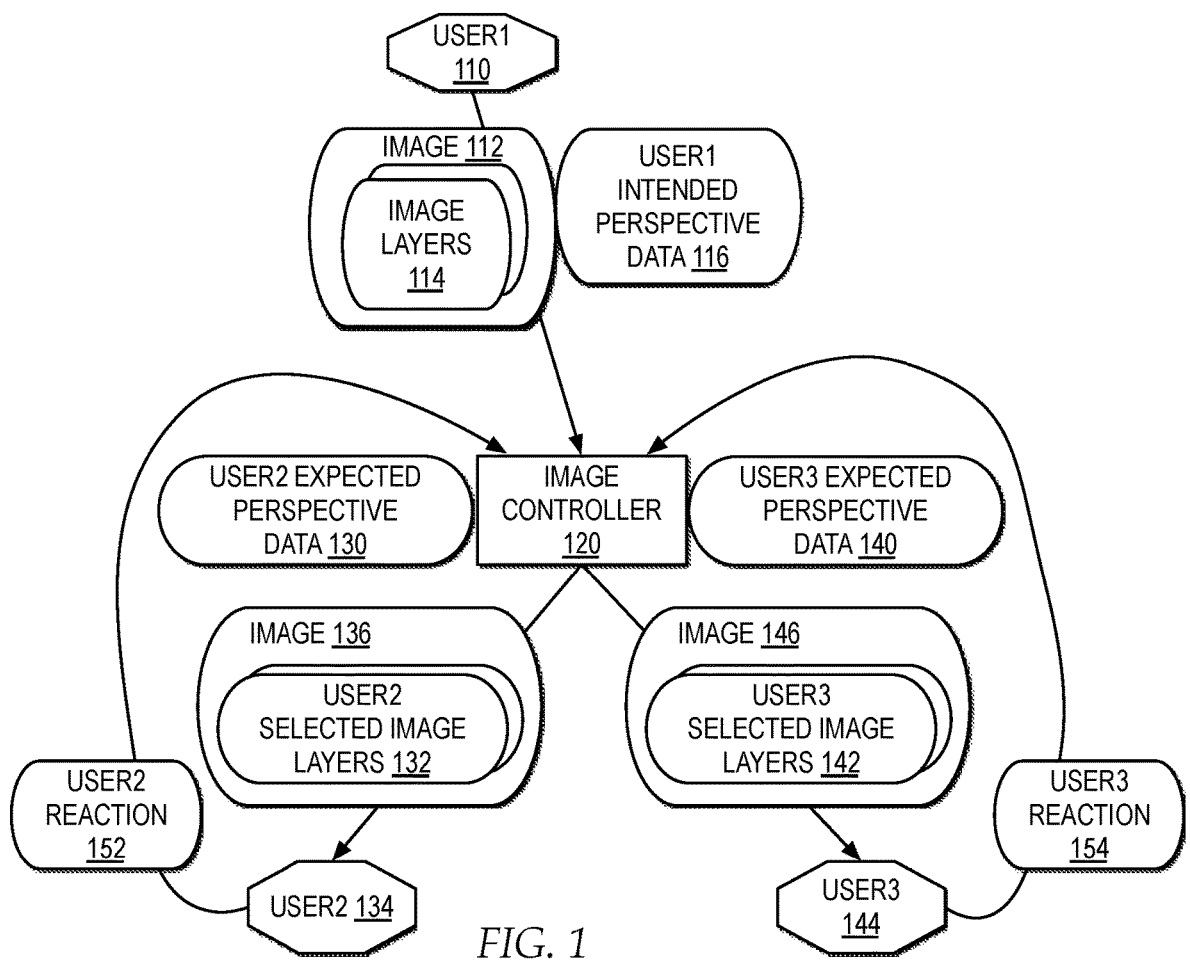
FIG. 1 is a block diagram illustrating one example of a system for adapting layers of an image for each viewer perspective.

FIG. 1 illustrates a block diagram of one example of a system for adapting layers of an image for each viewer perspective.

In one embodiment illustrated in FIG. 1, a user1 110 represents a user outputting an image 112, which is received by one or more viewers, illustrated as user2 134 and user3 144. In another embodiment, FIG. 1 includes additional or alternate users receiving image 112 for viewing.

In one embodiment, image 112 includes one or more identifiable image layers, illustrated as image layers 114. Image layers 114 represents one or more types of visual, audible, or other types of output elements within image 112, with image elements within image 112 identified within a single layer or multiple layers. In one example, user1 110, outputting image 112, represents one or more of a creator of one or more of image layers 114, an assembler of one or more of image layers 114, a sender of image 112, and a distributor of image 112. In one example, multiple users may contribute to image 112, where each image layer is identified with a different user who generated the layer and each user may add additional context data to each layer identified an intended perspective.

In one example, an image controller 120 manages communication of image 112 from user1 110 to each of user2 134 and user3 144. Traditionally, a sender of an image selects an image, which includes pre-selected static objects or objects based on pre-selected dynamically generated object rules, which are then view by users receiving the image with the pre-selected objects. According to an advantage of the invention, in one embodiment, image controller 120 intercepts image 112 and controls dynamic modification of layers of image 112 for each identifiable user to receive, according to the perspective of each identifiable user. As a result, in one embodiment, while user1 110 selects to send image 112 with pre-selected objects, image controller 120 selects to dynamically modify one or more layers of image 112 to convert image 112 into a separate image that is adapted for each identifiable user to receive, such as image 136 received by user2 134 and image 146 received by user3 144. In one example, user2 134 and user3 144 represent users who are identifiable as viewers, however in additional embodiments, additional users may receive and view image 112 who are not identifiable.

In one embodiment, image controller 120 identifies image layers 114 and assesses user1 intended perspective data 116 indicating one or more of an intention, emotion, feeling, mood, or perception of user1 110 related to one or more layers of image layers 114. For each user receiving image 112, image controller 120 assesses user perspective data for the recipient, such as user2 perspective data 130 for user2 134 and user3 perspective data 140 for user3 144.

In one embodiment, examples of image layers 114 of image 112 that may be replaced, modified, or adapted include one or more types of images dependent upon a type of environment within the image. For example, if a type of environment within an image is an outdoor environment, layers may include one or more of sky elements, natural environment elements, such as mountains, rivers, and seas, people, animals, buildings, and vehicles. In one example, each user perceives each of the layer elements with one or more types of perspective, under categories including, but not limited to intentions, emotions, feelings, moods, or perceptions. For example, one user's perspective of a same sky element is joy and happiness and another user's perspective of a particular sky element is sadness. In another example, different users may perceive a same natural environment element in a layer with perceptions of quiet, fear, anger, and serenity. In another example, different users may perceive a same person element in a layer with perceptions of solitude, distress, and compassion. In another example, different users may perceive a same animal element in a layer with perceptions of devotion, trust, enthusiasm, and danger. In another example, different users may perceive a same building element in a layer with perceptions of amazement, boredom, safety, and confusion. In another example, different users may perceive a same vehicle element in a layer with perceptions of noise, panic, stress, and irritability.

For each user receiving image 112, image controller 120 selects to send image 112 to the identifiable user without modification or selects to modify one or more layers of image 112 for a particular user receiving image 112. In one embodiment, image controller 120 compares user1 intended perspective data 116 for each layer with the recipient user perspective data to determine whether the recipient will have a similar perspective of an image layer as the sender's intended perspective of the image layer. If image controller 120 determines that a receiving user's perspective of a particular layer does not match with the sender's intended perspective of a particular layer, image controller 120 selects one or more alternative image elements for the particular layer to more likely align the perspective of the receiving user with the sending user and rebuilds the image sent to the user with one or more layers modified by the alternative image elements. For example, based on a comparison of user1 intended perspective data 116 with user2 perspective data 130 for image layers 114, image controller 120 determines whether to modify any layers of image layers 114 and sends an image 136 with user2 selected image layers 132 specified for user2 134. In addition, for example, based on a comparison of user1 intended perspective data 116 with user3 perspective data 140 for image layers 114, image controller 120 determines whether to modify any layers of image layers 114 and sends an image 146 with user3 selected image layers 142 specified for user3 144. In additional or alternate examples, image controller 120 controls dynamically selecting image layers of an image for one or more additional or alternate sending users and recipient users.

In one example, image 112 represents a picture of a mountain landscape with a clear sky in the background in an email update sent by user1 110 to multiple customers. User1 intended perspective data 116 includes a perspective that a layer with the picture of a mountain landscape with a clear sky in the background reflects a quiet and serene environment. User2 perspective data 130 includes a perspective that image controller 120 identifies as indicating that the picture of a mountain landscape with a clear sky in the background may generate a sense of anxiety because the user suffers from a condition such as vertigo where looking down from a great height causes a sensation of whirling and loss of balance. In one example, user2 perspective data 130 includes a perspective that image controller 120 identifies as indicating that the user associates a flat, calm, clear sky beach environment with a quiet and serene environment. In the example, image controller 120 adjusts one of image layers 114 to create image 136 with user2 selected image layers 132 replacing one or more layers with a mountain environment to reflect a flat, calm beach environment, keeping the layer with a clear sky. In another example, image controller 120 adjusts one or more layers of image layers 114 to create image 136 with user2 selected image layers 132 replacing one or more layers with the sky elements and mountain environment with one or more layers of a flat, calm, clear sky beach environment. In the example, by image controller 120 replacing one or more layers of image layer 114 with user2 selected image layers 132, user2 134 receives the communication with image 136, a modified version of image 112, that is anticipated to result in user2 134 reviewing image 136 and with a similar perspective that user1 110 had when selecting to send image 112.

In another example, image 112 represents a 30 second ending to a video published by user1 110 and accessed by multiple users from a video player. User1 intended perspective data 116 includes a perspective that a layer in the ending of the video of a mountain landscape with a clear sky in the background reflects a quiet and serene environment. User2 perspective data 130 includes a perspective that image controller 120 identifies as indicating that the ending of the video of a mountain landscape with a clear sky in the background may generate a sense of anxiety because the user suffers from a condition such as vertigo where looking down from a great height causes a sensation of whirling and loss of balance. In one example, user2 perspective data 130 includes a perspective that image controller 120 identifies as indicating that the user associates a flat, calm, clear sky beach environment with a quiet and serene environment. In the example, image controller 120 adjusts one of image layers 114 throughout the 30 second ending of the video to create image 136 with user2 selected image layers 132 replacing the layer with a mountain environment throughout the 30 seconds to reflect a flat, calm beach environment, keeping the layer with a clear sky. In another example, image controller 120 replaces image layers 114 to create image 136 with user2 selected image layers 132 by replacing image layers 114 with an alternative 30 second ending published by user1 110 that image controller 120 identifies as more likely to be perceived by user2 134 as reflecting a quiet and serene environment. In the example, by image controller 120 replacing one or more layers of image layer 114 with user2 selected image layers 132, user2 134 receives the communication with image 136, a modified version of image 112, that is anticipated to result in user2 134 perceiving the last 30 seconds of a video in image 136 with a similar perspective that user1 110 had when selecting to send image 112.

In one example, user2 134 may react to image 136. In one example, image controller 120 receives an indicator of the reaction by user2 134 to image 136 as user2 reaction 152. In addition, in one example, user3 144 may react to image 146. In one example, image controller 120 receives an indicator of the reaction by user3 144 to image 146 as user3 reaction 154. In one example, user 2 reaction 152 and user3 reaction 154 may include, but are not limited to, a like, a comment, and a reply.

In one example, image controller 120 receives user2 reaction 152 and user3 reaction 154 as feedback for additional updates and training of image controller 120. In one example, image controller 120 compares user2 reaction 152 with one or more of user1 intended perspective data 116, user2 perspective data 130 to determine one or more of whether user2 reaction 152 matches the reaction intended by user1 110 and whether user2 reaction 152 matches user2 perspective data 130, in order to train image controller 120 to more accurately predict image layers for user2 134 that match user1 intended perspective data 116. In addition, in one example, image controller 120 compares user3 reaction 154 with one or more of user1 intended perspective data 116, user3 perspective data 140 to determine one or more of whether user3 reaction 154 matches the reaction intended by user1 110 and whether user3 reaction 154 matches user3 perspective data 140, in order to train image controller 120 to more accurately predict image layers for user3 144 that match user1 intended perspective data 116.

Figure 2:
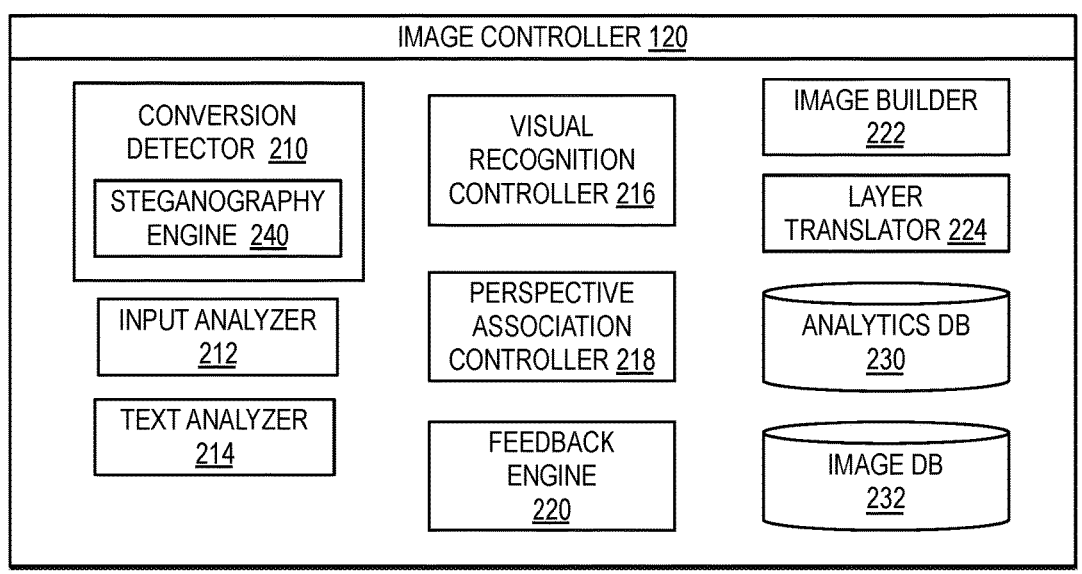
FIG. 2 is a block diagram illustrates one example of an image controller for adapting layers of an image for each identifiable recipient perspective.

FIG. 2 illustrates a block diagram of one example of an image controller for adapting layers of an image for each identifiable recipient perspective.

In one example, image controller 120 detects image 112 sent by user1 110 to one or more identifiable recipients, such as user2 134 and user3 144. In one example, image controller 120 detects image 112 sent by user1 110 using one or more types of push communication media, such as, but not limited to, an email, a text message, and other types of communication media. In another example, image controller 120 detects images posted by user1 110 and accessed by other identifiable users, such as user2 134 and user3 144 through one or more types of pull communication media, such as, but not limited to, as an application or website that provides access to an online image catalog on demand.

In one example, image controller 120 implements a conversion detector 210 for detecting whether an image should or should not be adapted by image controller 120. If conversion detector 210 detects that an image should not be adapted by image controller 120, image controller 120 passes image 112 to each identifiable recipient without adapting any of the layers of image 112. In one example, conversion detector 210 reads metadata for image 112 to detect whether the metadata specifies that a designation if the image should not be adapted. In another example, conversion detector 210 scans the contents of image 112 to determine if the contents of image 112 indicate that the image should not be adapted.

In one example, image controller 120 implements a steganography engine 240 to determine whether image 112 is marked as immutable, indicating the image is unchangeable once built and should not be adapted by image controller 120. In one example, by including an immutable flag or container in image 112, the image is identified as not convertible. If steganography engine 240 detects that image 112 is marked as immutable, then image controller 120 directs original image 112 to each identifiable recipient.

In one example, if conversion detector 120 detects that an image should be adapted by image controller 120, an input analyzer 212 of image controller 120 analyzes image 112 to determine if there is any context associated with image 112, whether in metadata or in communications proximate to image 112 within a communication media or interface. For example, input analyzer 212 scans file names and metadata associated with image 112 when created or subsequent to creation. For example, input analyzer 212 identifies prior or concurrent text messages as part of a communication in which user1 110 requests to send image 112. In another example, inputs analyzer 212 identifies context associated with image 112 by monitoring user interactions with images output in a social media interface, such as a user's comment or selection of a like or dislike selectable option, to determine if there is any context associated with image 112 expressly, or images of a same type as image 112, based on the user's interactions within social media interfaces. In another example, input analyzer 212 prompts user1 110 to enter text or other input identifying the perspective to be associated with image 112.

In one example, if input analyzer 212 identifies there is context associated with image 112, a text analyzer 214 of image controller 120 analyzes the context to determine one or more perspectives of user1 110. For example, text analyzer 214 extracts, from the identified text, one or more indicators of an intended emotion, feeling, mood, or other perception.

In one example, a visual recognition controller 216 of image controller 120 analyzes image 112 using visual recognition to detect one or more basic layers of image 112, such as layers 114. In one example, visual recognition controller 216 includes one or more controllers trained for performing visual recognition of one or more types of environments. In one example, visual recognition controller 216 applies a separate controller trained for each type of environment or each type of layers. In one example, image database (DB) 232 includes one or more layered images and one or more layers of images, with image identifiers, for use by visual recognition controller 216 in comparing and detecting layers 114 within image 112 and identifying types of images in layers 114.

In one example, a perspective association controller 218 analyzes the layers identified by visual recognition controller 216, in view of intended perspective data for the sending user in an analytics database (DB) 230, to assign an overall intended perspective to image 112 and a separate intended perspective to each of image layers 114. In one example, analytics DB 230 includes arrays identified with a user identifier, a layer description, a layer identifier, and a perspective identifier. In one example, the perspective identifiers includes one or more of an intended perspective of a sender or an expected perspective of a recipient.

In one example, analytics DB 230 is initialized, trained, and dynamically updated by recording historical interactions of each user with an image overall and with image layers. In one example, a feedback engine 220 manages recording of interactions of a user with an image overall and with image layers. In one example, feedback engine 220 monitors for user interactions to a social media interface displaying one or more images. Feedback engine 220 determines whether the types of images are already in image DB 232, and if the image types are not already in image DB 232, adds the image types to image DB 232. Feedback engine 220 records the user interactions to the social media interface, such as the user commenting or selecting a selectable like indicator within the social media interface or the user having an audio or tactile based response to the social media interface, and analyzes the user interactions as user responses to the types of images identified in image DB 232. In one example, feedback engine 120 selects one or more image layers from image DB 232 and prompts a user to provide feedback to one or more image layers from image DB 232. In one example, feedback engine 220 receives the user responses to the one or more image layers from image DB 232, identifies one or more types of perspectives identified in each user response, and updates a user profile in analytics DB 230 by updating an array identifying a user, layer description, layer, and types of perspectives identified for each of the image layers. In another example, as user2 134 receives image 136 and user3 144 receives image 146, feedback engine 220 collects any detected responses by user2 134 and user 3 144, respectively, returned from devices receiving image 136 and image 146. In one example, feedback engine 220 analyzes detected responses to identify one or more types of perspectives within the response and to determine whether the identifiable receiving users actual perspective, based on a response, matches user1 intended perspective data 116, in order to further specify arrays in analytics DB for use in future selection of layers.

In one example, feedback engine 220 monitors for interactions by a user with any image received by the user, including monitoring for interactions by a user with an image accessed by the user via a social media interface or service. For example, feedback engine 220 monitors whether a user selects an input interface option to "like" or comment on an image. In one example, feedback engine 220 may analyze the comment, including analyzing the tone of a comment, to predict a user's perspective. In addition, feedback engine 220 may send the image to visual recognition controller 216, for detecting multiple layers in the image the user reacts to. Feedback engine 220 may update analytics DB 230 with one or more arrays, each array identifying the user identifier, a description of each layer in an identified image, the layer of the image, and a perspective associated with each layer, based on a user's response to the image viewed in a social media interface.

In one example, a layer translator 224 of image controller 120 identifies, for a sending user intended perspective array, and analogous array in analytics DB 230 with expected perspective data for a receiving user. For example, layer translator 224 selects an array identifying an image for the receiving user, with a recipient perspective in the array matching a sender perspective in an array for a layer of the originally sent image.

In one example, an image builder of image controller 120 glues all the selected image layer intended for a particular identifiable recipient into a an image. For example, image controller 120 glues user2 selected image layers 132 with one or more original image layers of image layers 114, to generate image 136, and glues user3 selected image layers 142 with one or more original image layers of image layers 114, to generate image 146.

FIG. 3 illustrates an example of arrays identifying layers of an image translated into arrays of layers for an identifiable recipient.

In one example, an array 310 and an array 312 identified a series of arrays for a user "U1", such as user1 110. Each of array 310 and array 312 identify a layer description identified for each layer, such as image layers 114, of an image, such as image 112. For example, array 310 and array 312 identify a "layer description 1" and a "layer description N", respectively. In the example, each layer description correlates with an identified image layer, identified in array 310 and array 312 as "layer 1A" and "layer NA", respectively. Further, for user "U1", for each layer description and layer, a perspective is identified, such as "perspective A" and "perspective N", respectively, in array 310 and array 312.

In one example, layer translator 224 determines a selection of arrays identified with an identifiable recipient, where the selection of arrays each have a perspective for the identifiable recipient that matches the perspective of user "U1". In an additional or alternate embodiment, the number and type of arrays identifying image layers 114 for user "U1" may include additional arrays and may include additional or alternate layer description identifiers, layer identifiers, and perspective identifiers.

In one example, layer translator 224 determines that for user "U2", such as user2 134, an array 320 includes a perspective of "perspective A", which matches the perspective of "perspective A" in array 310. In one example, array 320 also identifies a same layer description of "layer description 1" and a same layer of "layer 1A" as the layer description and layer identifier in array 310. In the example, the layer identified by array 320 is the same as the original layer identified by array 310.

In one example, layer translator 224 determines that for user "U2", an array 322 includes a perspective of "perspective N", which matches the perspective of "perspective N"

in array 312. In one example, array 322 identifies a different layer description of "layer description NB" and a different layer of "layer NB" as the layer description and layer identifier in array 322. In the example, the layer identified by array 322 has a different layer image from the original layer image identified by array 312, but the intended perspective in array 312 matches the expected perspective in array 322. In the example, image builder 222 builds an image to send to identifiable user "U2" from array 320 and array 322.

FIG. 4 illustrates a block diagram of one example of an image with layers adapted for each identifiable recipient perspective.

In one example, a communication interception by image controller 120 includes context data 302 and image 112. In one example, image controller 120 identifies context data 302, such as the text surrounding image 112 in an electronic message, and identifies one or more indicator of the perspective of the sender of image 112. In addition, image controller 120 identifies each of audio layer 410, background image layer 312, foreground image layer 314, and text layer 316 in image 112.

In one example, image controller 120 adapts image 136 with a selection of the original layers of image 112, of audio layer 410, foreground image 314, and text layer 316, however, image controller 120 selects to modify background image layer 312 with user2 background image layer 320. In one example, image controller 120 adapts image 146 with a selection of the original layers of image 112 of audio layer 410, background image layer 312, and foreground image layer 314, however, image controller 120 selects to modify text layer 316 with user3 text layer 322. In one example, as illustrated in FIG. 4, image controller 120 may modify different layers of image 112 for each expected recipient perspective. In additional or alternate examples, image controller 120 may modify multiple layers of image 112 for each expected recipient perspective and may modify the same or different layers of image 112 for each expected recipient perspective.

Figure 5:
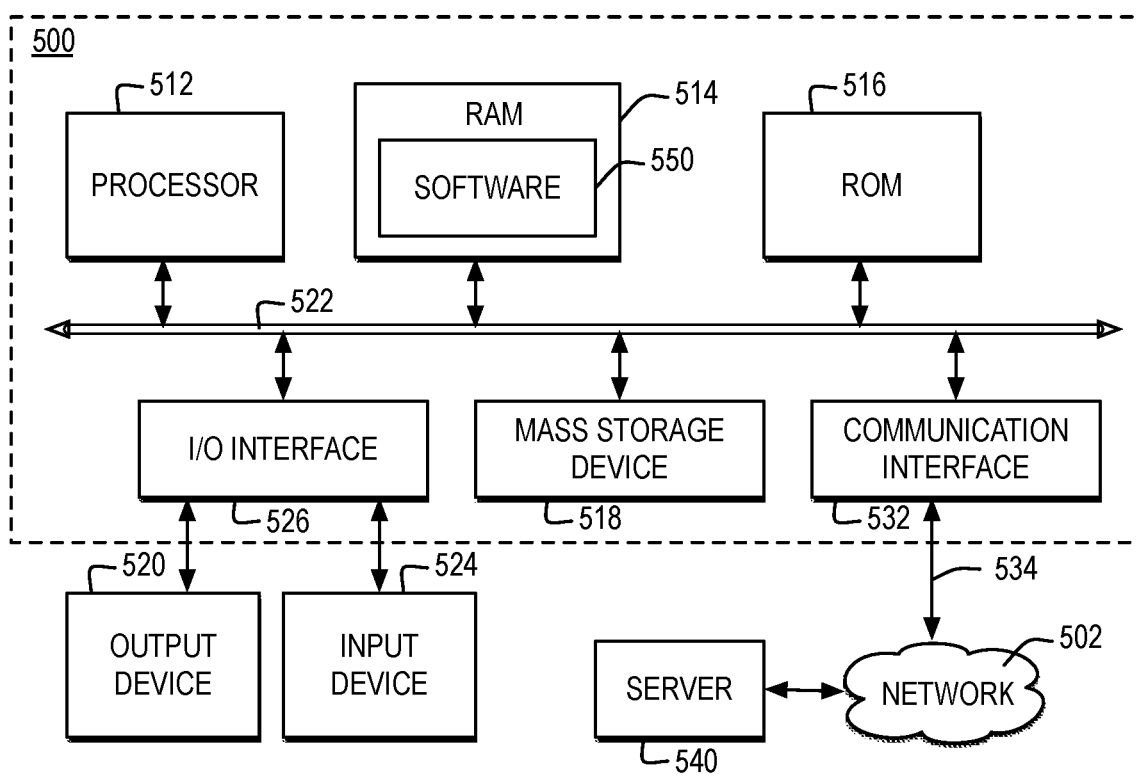
FIG. 5 is a block diagram illustrating one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. In one embodiment, when implemented as a server or node, computer system 500 includes multiple processors designed to improve network servicing power.

In one embodiment, processor 512 is at least one general-purpose processor that, during normal operation, processes data under the control of software 550, which includes at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. In one embodiment, software 550 includes, but is not limited to, code, applications, protocols, interfaces, and processes for controlling one or more systems within a network including, but not limited to, an adapter, a switch, a server, a cluster system, and a grid environment.

In one embodiment, computer system 500 communicates with a remote computer, such as server 540, or a remote client. In one example, server 540 is connected to computer system 500 through any type of network, such as network 502, through a communication interface, such as network interface 532, or over a network link connected, for example, to network 502.

In one embodiment, multiple systems within a network environment are communicatively connected via network 502, which is the medium used to provide communications links between various devices and computer systems communicatively connected. Network 502 includes permanent connections such as wire or fiber optics cables and temporary connections made through telephone connections and wireless transmission connections, for example, and may include routers, switches, gateways and other hardware to enable a communication channel between the systems connected via network 502. Network 502 represents one or more of packet-switching based networks, telephony based networks, broadcast television networks, local area and wire area networks, public networks, and restricted networks.

Network 502 and the systems communicatively connected to computer 500 via network 502 implement one or more layers of one or more types of network protocol stacks which may include one or more of a physical layer, a link layer, a network layer, a transport layer, a presentation layer, and an application layer. For example, network 502 implements one or more of the Transmission Control Protocol/Internet Protocol (TCP/IP) protocol stack or an Open Systems Interconnection (OSI) protocol stack. In addition, for example, network 502 represents the worldwide collection of networks and gateways that use the TCP/IP suite of protocols to communicate with one another. Network 502 implements a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

In one embodiment, the operations performed by processor 512 control the operations of flowchart of FIGS. 6-9 and other operations described herein. In one embodiment, operations performed by processor 512 are requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, contain hardwired logic for performing the operations of flowcharts in FIGS. 6-9.

In one embodiment, computer system 500 includes multiple peripheral components that facilitate input and output. These peripheral components are connected to multiple controllers, adapters, and expansion slots, such as input/output (I/O) interface 526, coupled to one of the multiple levels of bus 522. For example, input device 524 includes, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 5, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 5 may vary. Furthermore, those of ordinary skill in the art will appreciate that the depicted example is not meant to imply architectural limitations with respect to the present invention.

Figure 6:
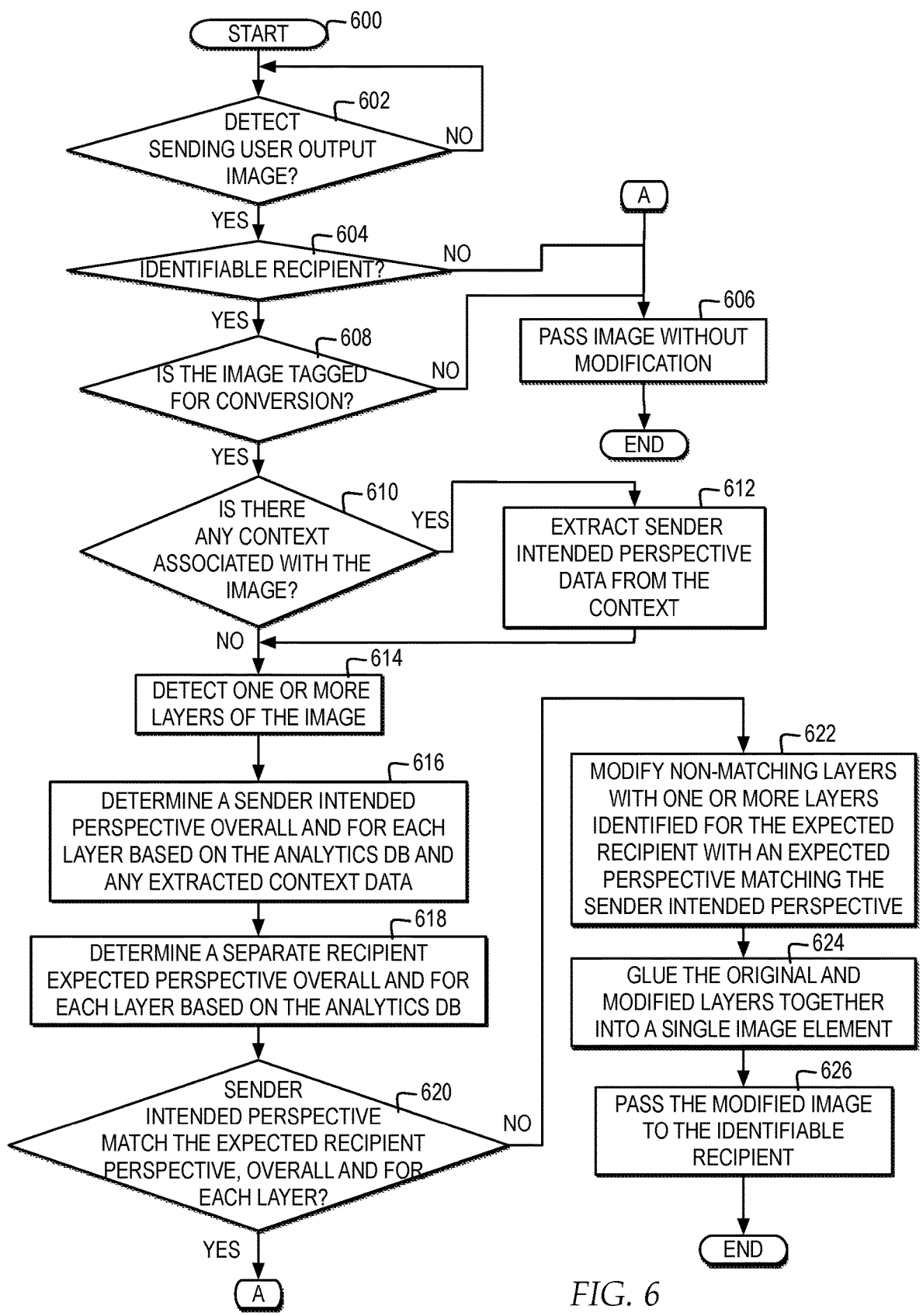
FIG. 6 illustrates one example of a high level logic flowchart of a process and computer program for adapting layers of an image for a recipient perspective.

FIG. 6 illustrates a high level logic flowchart of a process and computer program for adapting layers of an image for a recipient perspective.

In one example, the process and program starts at block 600 and thereafter proceeds to block 602. Block 602 illustrates a determination whether an image controller detects an output image from a sending user. At block 602, if an image controller detects an output image from a sending user, then the process passes to block 604. Block 604 illustrates a determination whether the output image is to be directed to an identifiable recipient. At block 604, if the output image is not to be directed to an identifiable recipient, then the process passes to block 606. Block 606 illustrates passing the image without modification, and the process ends. Returning to block 604, if the output image is to be directed to an identifiable recipient, then the process passes to block 608.

Block 608 illustrates a determination whether the image is tagged for conversion. At block 608, if the image is not tagged for conversion, then the process passes to block 606, and proceeds as previously described. At block 608, if the image is tagged for conversion, then the process passes to block 610. Block 610 illustrates a determination whether there is any context associated with the image, where context includes, but is not limited to, attached metadata and text surrounding the image in a communication. At block 610, if there is not context associated with the image, then the process passes to block 614. At block 610, if there is context associated with the image, then the process passes to block 612. Block 612 illustrates extracting sender intended perspective data from the context, and the process passes to block 614.

Block 614 illustrates detecting one or more layers of the image. Next, block 616 illustrates determining a sender intended perspective overall and for each layer based on the analytics DB and any extracted context data. Next, block 618 illustrates determining a separate recipient expected perspective overall and for each layer based on the analytics DB. Thereafter, block 620 illustrates a determination whether the sender intended perspective matches the expected recipient perspective, overall and for each layer. At block 620, if there is a match, then the process returns to block 606. At block 620, if there is not a match, then the process passes to block 622.

Block 622 illustrates modifying the non-matching layers with one or more layers identified for the expected recipient with an expected perspective matching the sender intended perspective. Next, block 624 illustrates gluing the original layers and modified layers together into a single image element. Thereafter, block 626 illustrates passing the modified image to the identifiable recipient, and the process ends.

FIG. 7 illustrates a high level logic flowchart of a process and computer program for monitoring for a response to an image from an identifiable user.

In one example, the process and computer program begin at block 700 and thereafter proceed to block 702. Block 702 illustrates a determination whether an identifiable recipient received an image. Next, block 704 illustrates triggering monitoring of a response by the identifiable recipient to the image with monitoring requested. Thereafter, block 706 illustrates a determination whether a response by the identifiable recipient to the image is detected before a timeout. At block 706, if a response by the identifiable recipient to the image is not detected before a timeout, then the process ends. At block 706, if a response by the identifiable recipient to the image is detected before a timeout, then the process passes to block 708. Block 708 illustrates sending feedback of the detected response and an identifier for the identifiable recipient to a requesting image controller, and the process ends.

FIG. 8 illustrates a high level logic flowchart of a process and computer program for managing updates to a user perspective profile based on user responses to an image.

In one example, the process and computer program begin at block 800 and thereafter proceed to block 802. Block 802 illustrates a determination whether feedback is received for an identifiable recipient in response to an image. At block 802, if feedback is received for an identifiable recipient in response to an image, then the process passes to block 804. Block 804 illustrates analyzing the feedback to identify one or more types of perspective identified in the feedback. Next, block 806 illustrates updating a user profile for the identifiable recipient in an analytics DB with the identified types of perspective and an identifier for the image, and the process ends.

Figure 9:
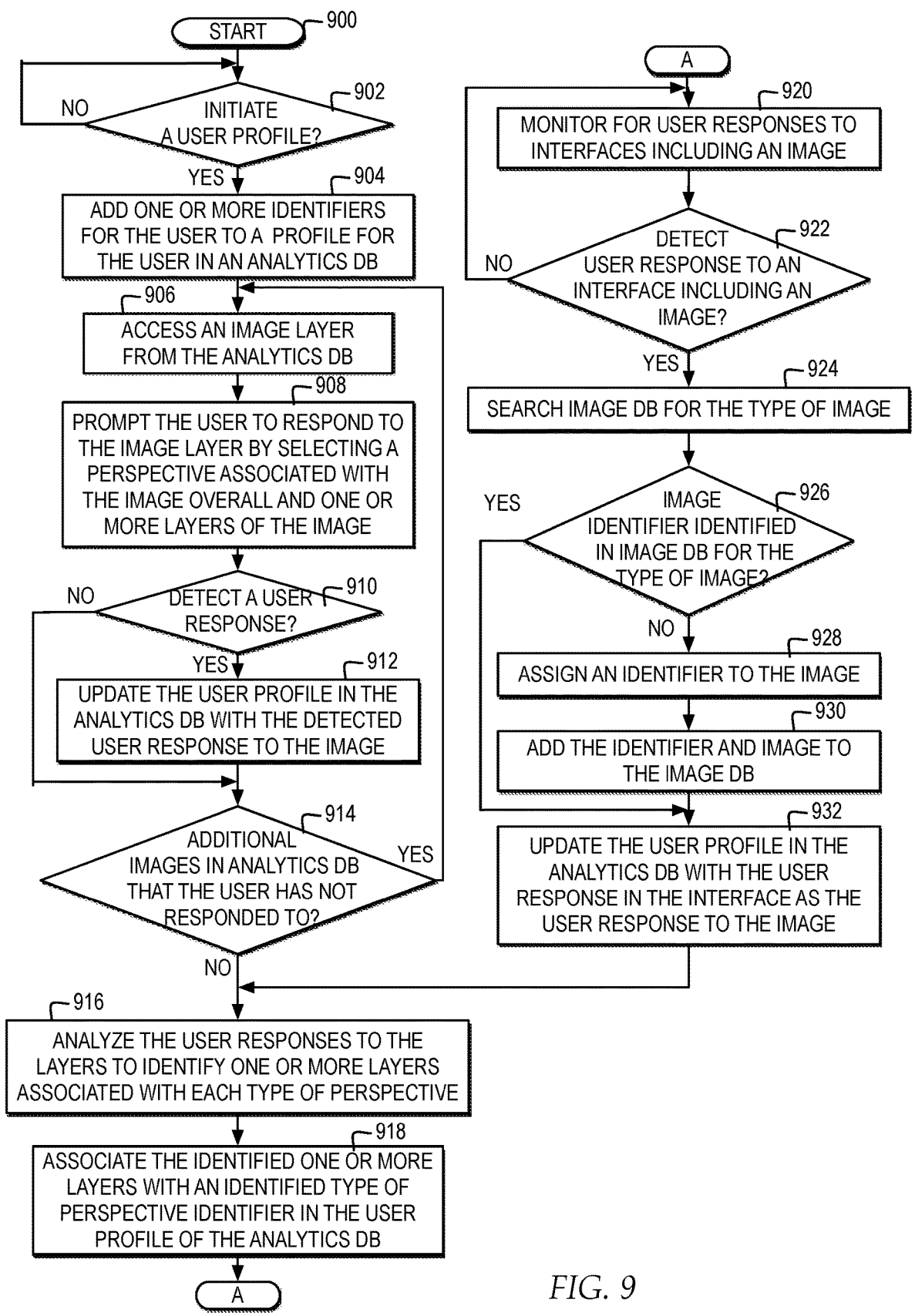
FIG. 9 illustrates a high level logic flowchart of a process and computer program for managing generation of a user perspective to one or more image layers.

FIG. 9 illustrates a high level logic flowchart of a process and computer program for managing generation of a user perspective to one or more image layers.

In one example, the process and program starts at block 900 and thereafter proceeds to block 902. Block 902 illustrates a determination whether a user profile is initiated. Next, block 904 illustrates adding one or more identifiers for the user to a profile for the user in an analytics DB. Thereafter, block 906 illustrates accessing an image layer from the analytics DB. Next, block 908 illustrates prompting the user to respond to the image layer by selecting a perspective associated with the image overall and one or more layers of the image. Thereafter, block 910 illustrates a determination whether a user response is detected. At block 910, if a user response is detected, then the process passes to block 912. Block 912 illustrates updating the user profile in the analytics DB with the detected user response to the image, and the process passes to block 914. Returning to block 910, if a user response is not detected, then the process passes to block 914.

Block 914 illustrates a determination whether there are additional images in the analytics DB that the user has not responded to. At block 914, if there are additional images in the analytics DB that the user has not responded to, then the process returns to block 906. At block 914, if there are not additional images in the analytics DB for the user to respond to, then the process passes to block 916.

Block 916 illustrates analyzing the user responses to the layers to identify one or more layers associated with each type of perspective. Next, block 918 illustrates associating the identified one or more layers with an identified type of perspective identifier in the user profile of the analytics DB, and the process passes to block 920.

Block 920 illustrates monitoring for user responses to interfaces including an image, and the process passes to block 922. For example, block 920 monitors for user responses in a social media interface including an image, where the responses include interactions by the user within the interface, such as, but not limited to, commenting within the social media interface and selecting a selectable options to like an image within the social media interface. In another example, block 920 monitors for user responses through audio or tactile based responses to an image displayed in an interface. responses Block 922 illustrates a determination whether a user response to an interface including an image is detected. At block 922, if a user response to an interface including an image is not detected, then the process returns to monitor at block 920. At block 922, if a user response to an interface including an image is detected, then the process passes to block 924. Block 924 illustrates searching an image DB for the type of image included in the interface, and the process passes to block 926.

Block 926 illustrates a determination whether an image identifier is identified in the image DB for the type of image. At block 926, if an image identifier is not identified in the image DB for the type of image, then the process passes to block 928. Block 928 illustrates assigning an identifier to the type of image. Next, block 930 illustrates adding the identifier and the image to the image DB. Thereafter, block 932 illustrates updating the user profile in the analytics DB with the user response in the interface as the user response to the image, and the process returns to block 916.

Returning to block 926, at block 926, if an image identifier is identified in the image DB for the type of image, then the process passes to block 932, and updates the user profile in the analytics DB with the user response in the interface as the user response to the image, as previously described.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
   receiving, by a computer system, a digital representation of an image originating from a user;
   performing, by the computer system, a visual recognition operation on the image to identify at least one visual layer of a plurality of layers within the image and a separate perspective of the user associated with each layer;
   identifying, by the computer system, a replacement layer assigned to an identifiable recipient, for a particular layer of the plurality of layers, in an analytics database specifying an expected perspective that corresponds with the separate perspective of the user for the particular layer; and
   modifying, by the computer system, the particular layer with the replacement layer for obtaining a transformed image amended for the identifiable recipient.

2. The method according to claim 1, further comprising:
   identifying, by the computer system, context data associated with the image originating from the user; and
   performing, by the computer system, the visual recognition operation of the image to identify the at least one visual layer of the plurality of layers within the image, wherein the separate perspective of the user associated with each layer is identified from the context data wherein the separate perspective of the user comprises at least one of an intention, emotion, feeling, mood, and perception of the user.

3. The method according to claim 2, further comprising:
   accessing, by the computer system, the context data from an electronic communication comprising the image;
   analyzing, by the computer system, the context data to identify one or more responses in the context data; and identifying, by the computer system, the separate perspective of the user associated with each layer of the plurality of layers of the image.

4. The method according to claim 2, further comprising:
intercepting, by the computer system, the digital representation of the image and context data from the user from an output stream;
determining, by the computer system, whether there is an intended user for receiving the image from the output, where the intended user is the identifiable recipient; and
in response to determining there is not the intended user, passing, by the computer system, the image to an output target without modification.

5. The method according to claim 1, further comprising:
in response to the identifiable recipient receiving the transformed image with monitoring requested, triggering monitoring, by the computer system, of a response by the identifiable recipient to the transformed image within an interface outputting the transformed image;
in response to detecting the response by the identifiable recipient to the transformed image by an input by the identifiable recipient of one or more of a comment, audio response, and tactile response, identifying, by the computer, a type of perspective within the response; and
analyzing, by the computer system, the type of perspective within the response to determine whether the response matches the separate perspective of the user associated with each layer for use in training a user profile for the identifiable recipient in the analytics database.

6. The method according to claim 1, further comprising:
determining, by the computer system, whether the image is marked as immutable in a container; and
in response to detecting the image is marked as immutable, passing, by the computer system, the image to the identifiable recipient without modification.

7. The method according to claim 1, wherein modifying, by the computer system, the particular layer with the replacement layer for obtaining a transformed image amended for the identifiable recipient further comprises:
combining, by the computer system, a selection of the plurality of layers with the replacement layer to generate the transformed image amended for the identifiable recipient.

8. The method according to claim 1, further comprising:
identifying, by the computer system, an additional replacement layer assigned to an additional identifiable recipient, for the particular layer of the plurality of layers, in an analytics database specifying an additional expected perspective that corresponds with the separate perspective of the user for the particular layer;
combining, by the computer system, a selection of the plurality of layers with the additional replacement layer to generate an additional transformed image amended for the additional identifiable recipient;
passing, by the computer system, the transformed image to the identifiable recipient; and
passing, by the computer system, the additional transformed image to the additional identifiable recipient.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to receive a digital representation of an image originating from a user;
program instructions to perform a visual recognition operation on the image to identify at least one visual layer of a plurality of layers within the image and a separate perspective of the user associated with each layer;
program instructions to identify a replacement layer assigned to an identifiable recipient, for a particular layer of the plurality of layers, in an analytics database specifying an expected perspective that corresponds with the separate perspective of the user for the particular layer; and
program instructions to modify the particular layer with the replacement layer for obtaining a transformed image amended for the identifiable recipient.

10. The computer system according to claim 9, the stored program instructions further comprising:
program instructions to identify context data associated with the image originating from the user; and
program instructions to perform the visual recognition operation of the image to identify the at least one visual layer of the plurality of layers within the image, wherein the separate perspective of the user associated with each layer is identified from the context data, wherein the separate perspective of the user comprises at least one of an intention, emotion, feeling, mood, and perception of the user.

11. The computer system according to claim 10, the stored program instructions further comprising:
program instructions to access the context data from an electronic communication comprising the image;
program instructions to analyze the context data to identify one or more responses in the context data; and
program instructions to identify the separate perspective of the user associated with each layer of the plurality of layers of the image.

12. The computer system according to claim 10, the stored program instructions further comprising:
program instructions to intercept the digital representation of the image and context data from the user from an output stream;
program instructions to determine whether there is an intended user for receiving the image from the output, where the intended user is the identifiable recipient; and
program instructions to, in response to determining there is not the intended user, pass the image to an output target without modification.

13. The computer system according to claim 9, the stored program instructions further comprising:
program instructions, in response to the identifiable recipient receiving the transformed image with monitoring requested, to trigger monitoring of a response by the identifiable recipient to the transformed image within an interface outputting the transformed image;
program instructions, in response to detecting the response by the identifiable recipient to the transformed image by an input by the identifiable recipient of one or more of a comment, audio response, and tactile response, to identify a type of perspective within the response; and
program instructions to analyze the type of perspective within the response to determine whether the response matches the separate perspective of the user associated with each layer for use in training a user profile for the identifiable recipient in the analytics database.

14. The computer system according to claim 9, the stored program instructions further comprising:
- program instructions to determine whether the image is marked as immutable in a container; and
- program instructions to, in response to detecting the image is marked as immutable, pass the image to the identifiable recipient without modification.

15. The computer system according to claim 9, wherein the program instructions to modify the particular layer with the replacement layer for obtaining a transformed image amended for the identifiable recipient further comprise:
- program instructions to combine a selection of the plurality of layers with the replacement layer to generate the transformed image amended for the identifiable recipient.

16. The computer system according to claim 9, the stored program instructions further comprising:
- program instructions to identify an additional replacement layer assigned to an additional identifiable recipient, for the particular layer of the plurality of layers, in an analytics database specifying an additional expected perspective that corresponds with the separate perspective of the user for the particular layer;
- program instructions to combine a selection of the plurality of layers with the additional replacement layer to generate an additional transformed image amended for the additional identifiable recipient;
- program instructions to pass the transformed image to the identifiable recipient; and
- program instructions to pass the additional transformed image to the additional identifiable recipient.

17. A computer program product comprises a computer readable storage medium having program instructions embodied therewith, wherein the computer readable storage medium is not a transitory signal per se, the program instructions executable by a computer to cause the computer to:
- receive, by a computer, a digital representation of an image originating from a user;
- perform, by the computer, a visual recognition operation on the image to identify at least one visual layer of a plurality of layers within the image and a separate perspective of the user associated with each layer;
- identify, by the computer, a replacement layer assigned to an identifiable recipient, for a particular layer of the plurality of layers, in an analytics database specifying an expected perspective that corresponds with the separate perspective of the user for the particular layer; and
- modify, by the computer, the particular layer with the replacement layer for obtaining a transformed image amended for the identifiable recipient.

18. The computer program product according to claim 17, further comprising the program instructions executable by the computer to cause the computer to:
- identify, by the computer, context data associated with the image originating from the user; and
- perform, by the computer, the visual recognition operation of the image to identify the at least one visual layer of the plurality of layers within the image, wherein the separate perspective of the user associated with each layer is identified from the context data, wherein the separate perspective of the user comprises at least one of an intention, emotion, feeling, mood, and perception of the user.

19. The computer program product according to claim 18, further comprising the program instructions executable by the computer to cause the computer to:
- access, by the computer, the context data from an electronic communication comprising the image;
- analyze, by the computer, the context data to identify one or more responses in the context data; and
- identify, by the computer, the separate perspective of the user associated with each layer of the plurality of layers of the image.

20. The computer program product according to claim 17, further comprising the program instructions executable by the computer to cause the computer to:
- in response to the identifiable recipient receiving the transformed image with monitoring requested, trigger monitoring, by the computer, of a response by the identifiable recipient to the transformed image within an interface outputting the transformed image;
- in response to detecting the response by the identifiable recipient to the transformed image by an input by the identifiable recipient of one or more of a comment, audio response, and tactile response, identifying, by the computer, a type of perspective within the response; and
- analyze, by the computer, the response to determine whether the type of perspective within the response matches the separate perspective of the user associated with each layer for use in training a user profile for the identifiable recipient in the analytics database.

* * * * *